Figure 1:
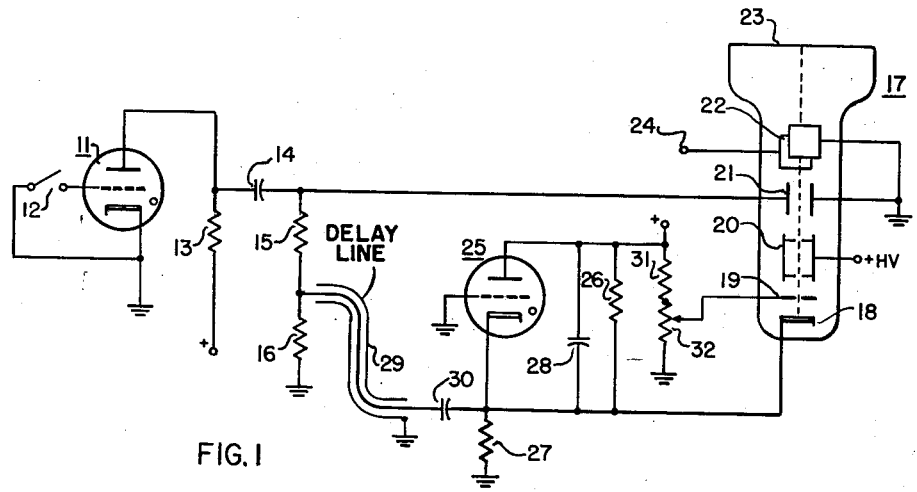

May 4, 1954   B. J. WILSON   2,677,783
SINGLE TRACE HIGH-SPEED TIME BASE CIRCUIT
Filed March 7, 1952

*INVENTOR*
BURTON J. WILSON
BY
Harry M. Saragovitz
*Attorney*

Patented May 4, 1954

2,677,783

UNITED STATES PATENT OFFICE 2,677,783

SINGLE TRACE HIGH-SPEED TIME BASE CIRCUIT

Burton J. Wilson, Champaign, Ill., assignor to the United States of America as represented by the Secretary of the Army Application March 7, 1952, Serial No. 275,417

5 Claims. (Cl. 315—22)

This invention relates to time base circuits for cathode ray oscillograph operations. In particular it relates to a time base circuit in an arrangement for producing a signal high speed trace suitable for recording transient phenomena. In general it relates to the organization of a cathode ray oscillograph and control circuits for producing a single high speed time base trace together with blanking potentials to suppress indications following the trace.

The prior art is replete with cathode ray tube time base circuits for the display of periodic phenomena and these circuits generally provide time base traces recurrent at a desired rate together with blanking signals for suppressing the ray during each retrace interval. If, however, it is desired to produce a single trace at high speed for a time base, the problem is more difficult and a satisfactory solution which produces a linear trace together with a suitable blanking signal to follow appears not to have been achieved.

Accordingly it is an object of the present invention to provide a high speed single trace time base for oscillograph operation which avoids many of the disadvantages and limitations of prior art arrangements. It is a particular object of the present invention to provide a circuit which produces a high speed linear single trace to serve as a time base with a cathode ray tube and which also produces a potential suitable to blank the ray of the cathode ray tube for a sufficient interval following the trace.

In accordance with the present invention a high speed single trace oscillograph arrangement comprises a cathode ray display tube and a first circuit for producing a deflection voltage having a rapid linear trace interval and a slower exponential retrace interval. This circuit is comprised of a gaseous discharge tube which has a linear ionization current-versus-time characteristic. Also provided is a second circuit for producing a blanking voltage, which voltage has a rapid trace interval and a slower exponential retrace interval.

Means are provided for operatively coupling the deflection and the blanking voltages to the cathode ray tube. Further means are provided for triggering the first circuit together with means comprising a delay line for triggering the second circuit from the first circuit at a chosen time interval after the triggering of the first circuit.

For a better understanding of the present invention, together with other and further objects thereof, reference is had to the following description taken in connection with the accompanying drawing and its scope will be pointed out in the appended claims.

Figure 2:
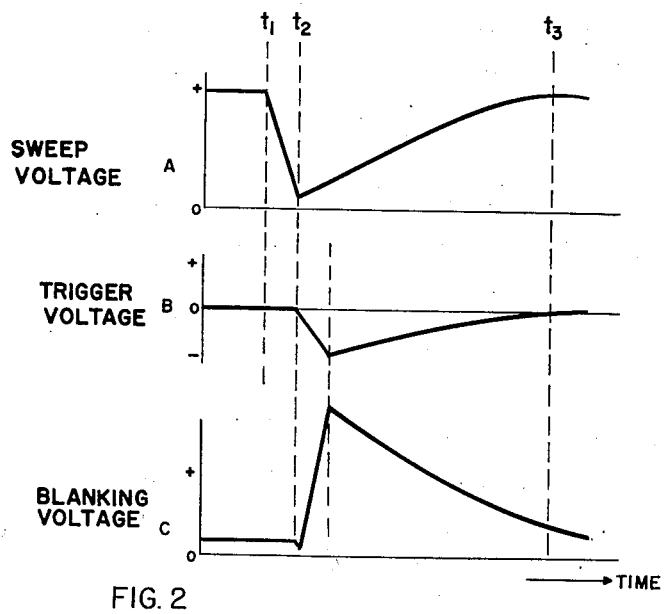

In the drawing, Fig. 1 is a schematic circuit diagram illustrating a preferred embodiment of the invention and Fig. 2 is a series of graphs representing certain operating characteristics of the circuit of Fig. 1.

Referring now to Fig. 1, the trace generating circuit comprises a gaseous type of tube 11, for example a thyratron, having cathode, grid and plate elements. A switch 12 connected in the grid circuit is provided and when quickly closed it initiates the trace operation by triggering the tube. A charging condenser 14 is connected to the plate of tube 11 and is supplied with a suitable charging potential from the source marked plus via a high resistor 13. The condenser 14 is connected to ground via resistors 15 and 16 in series. The trace voltage which is developed across these series resistors is applied to one of the two horizontal deflection plates 21 of the cathode ray tube 17. The other plate 21 is shown at ground potential but it will be understood that it may be connected to a source of potential for centering the ray. The cathode ray tube includes an electron gun comprising a cathode 18, a control electrode 19 and an eccelerating electrode 20 to which a high voltage operating potential is applied. The vertical deflection plates 22 are provided with an input terminal 24 to which the signal voltage which is to be displayed is applied. The fluorescent screen is labeled 23.

A portion of the trace voltage which is developed across the resistor 16 is coupled to the cathode load resistor 27 of a second thyratron tube 25 via a delay line 29 and coupling condenser 30. The output circuit of tube 25 is comprised of a charging condenser 28 and parallel resistor 26 for developing a suitable blanking voltage. This voltage is applied across resistor 31 and potentiometer 32 in series and a suitable portion of the voltage from potentiometer 32 is applied to the cathode ray tube control electrode 19.

Considering now the operation of the system, in the trace forming circuit the condenser 14 is normally charged to a chosen D. C. potential by means of the voltage applied to resistor 13. The maximum level to which condenser 14 is charged is shown in the graph A of Fig. 2. The start of the trace which is initiated by closing of the switch 12 is indicated as $t_1$. Switch 21 is preferably a microswitch which in operation is quickly closed and then reopened. The grounding of the grid of tube 11 via the closing of switch 12 causes condenser 14 to start discharging through the plate-cathode path of tube 11 since conduction immediately begins by the gas within 11 starting to ionize. It has been discovered that most thyratrons, when so connected to provide a discharge path, have an ionization current-versus-time characteristic which is substantially linear but the entire ionization is accomplished in a very short period of time. This ionization which corresponds to the discharge of condenser 14 is illustrated as the linear portion of graph A between the times labeled $t_1$ and $t_2$. The conduction ends at the time $t_2$ when the voltage of the condenser has fallen to a level where ionization of the gas within the tube 11 can no longer be supported. Thereafter, providing switch 12 is now open, the condenser 14 again starts to recharge through resistor 13 and this charging to the initial value is exponential as shown in the interval between $t_2$ and $t_3$ of graph A and it will be clear that the rate of this exponential curve may be determined by the choice of suitable values for condenser 14 and resistors 13, 15 and 16. The result of the operation thus far described causes the ray of the cathode ray tube to trace a path on the screen 23 from left to right at a linear and very rapid rate which is suitable to display very rapidly occurring transient signals such as may be applied to the vertical deflection terminal 24.

The portion of the trace voltage which develops across resistor 16 is supplied to the cathode of discharge tube 25 via the section of transmission line 29 which serves as a delay line. The delay is determined by the length of the line 29 and ordinarily this will be chosen so that the delay is equal to the time interval of the trace; that is the interval between $t_1$ and $t_2$. Accordingly the voltage which is developed across cathode resistor 27 relative to ground will be of the form shown in the graph B of Fig. 2. The negative potential thus applied to the cathode of tube 25 starts at the time $t_2$ and serves to trigger the second circuit from the first circuit at a chosen time interval after the triggering of the first circuit. The control grid of tube 25 is grounded and accordingly a negative voltage applied to the cathode is equivalent to a positive voltage applied to the grid to initiate conduction in tube 25.

Prior to the start of conduction in tube 25 the condenser 28 has been charged to a positive potential corresponding to the D. C. voltage across resistor 26. The triggering of tube 25 causes a rapid discharge of this condenser. The graph C of Fig. 2 illustrates the voltage changes which occur between the cathode of tube 25 and ground and similarly, except for an initial bias from potentiometer 32, it illustrates the voltage changes which occur between the cathode of cathode ray tube 17 and control electrode 19. It will be evident from this graph that the cathode of 25 is initially at a low positive potential relative to its control grid up to the time $t_2$ and no conduction in tube 25 occurs. However, immediately following the triggering potential the cathode voltage rises sharply until condenser 28 is discharged and thereafter the cathode voltage follows at an exponential rate of recharging. This voltage, since it is also applied between the control element 19 and the cathode 18 of the display tube 17 acts as a blanking signal. In summary then the control grid potential of display tube 17 is such that the ray is incident on the screen 23 during the high speed trace interval and is then quickly blanked or suppressed by the blanking voltage shown in graph C and remains blanked for a relatively long interval during the exponential recharge of condenser 28.

If the rise in the voltage shown in graph C is not sufficiently rapid to immediately cause the desired blanking, the delay line may be chosen of shorter length so the blanking will start at a more suitable earlier time. It is evident, therefore, that the arrangement described comprises a first circuit which utilizes the ionization current-versus-time characteristic of tube 11 for discharging condenser 14 to provide a high speed linear time base trace and that means comprising the delay line 29 are employed for triggering the blanking circuit from the first circuit at a chosen time interval after the triggering of the first circuit.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high speed single trace oscillograph arrangement comprising a cathode ray display tube, a first circuit for producing a deflection voltage having a rapid linear trace interval and a slower exponential retrace interval, said circuit comprising a gaseous discharge tube having a linear ionization current-versus-time characteristic, a second circuit comprising means for producing a blanking voltage, means operatively coupling said deflection and said blanking voltages to said cathode ray tube and means comprising a delay line for actuating said second circuit immediately following said rapid linear trace interval.

2. A high speed single trace oscillograph arrangement comprising a cathode ray display tube, a first circuit for producing a deflection voltage having a rapid linear trace interval and a slower exponential retrace interval, said circuit comprising a gaseous discharge tube having a linear ionization current-versus-time characteristic, a second circuit for producing during a predetermined time interval a blanking voltage, means operatively coupling said deflection and said blanking voltages to said cathode ray tube, means for triggering said first circuit and means comprising a delay line for triggering said second circuit from said first circuit at a chosen time interval after the triggering of said first circuit.

3. A high speed single trace oscillograph arrangement comprising a cathode ray display tube, a first circuit for producing a deflection voltage having a rapid linear trace interval and a slower exponential retrace interval, said circuit comprising a gaseous discharge tube having a linear ionization current-versus-time characteristic, a second circuit for producing a blanking voltage having a rapid trace interval and a slower exponential retrace interval, means operatively coupling said deflection and said blanking voltages to said cathode ray tube, means for triggering said first circuit and means comprising a delay line for triggering said second circuit from said first circuit at a chosen time interval after the triggering of said first circuit.

4. A high speed single trace oscillograph arrangement comprising a cathode ray display tube, a first circuit for producing a deflection voltage having a rapid linear trace interval and a slower exponential retrace interval, said circuit comprising a gaseous discharge tube having a linear ionization current-versus-time characteristic and adapted to be triggered into operation, a second circuit for producing a blanking voltage having a rapid trace interval and a slower exponential retrace interval, said second circuit comprising a gaseous discharge tube adapted to be triggered into operation, means operatively coupling said deflection and said blanking voltages to said cathode ray tube, means for triggering said first circuit and means comprising a delay line for triggering, said second circuit from said first circuit at a chosen time interval after the triggering of said first circuit.

5. A high speed single trace time base generator circuit for producing a deflection voltage having a rapid linear trace interval and a slower exponential retrace interval comprising a gaseous discharge tube having a linear ionization current-versus-time characteristic and a capacitor resistance network, means for charging said capacitor through said resistance, means for discharging said capacitor through said tube, and means for utilizing the potential developed across said tube during said discharge time for time base.

References Cited in the file of this patent

UNITED STATES PATENTS

| Number | Name | Date |
|---|---|---|
| 2,415,870 | De Ryder | Feb. 18, 1947 |
| 2,426,419 | Spector | Aug. 26, 1947 |
| 2,431,766 | Miller et al. | Dec. 2, 1947 |
| 2,448,771 | Christaldi | Sept. 7, 1948 |
| 2,456,973 | Mao | Dec. 21, 1948 |
| 2,476,978 | Hilton | July 26, 1949 |
| 2,595,228 | Crist | May 6, 1952 |